United States Patent
Wang et al.

(10) Patent No.: US 10,609,133 B2
(45) Date of Patent: Mar. 31, 2020

(54) METHOD AND DEVICE FOR ESTABLISHING COMMUNICATION CONNECTION

(71) Applicant: BEIJING BAIDU NETCOM SCIENCE AND TECHNOLOGY CO., LTD., Beijing (CN)

(72) Inventors: Haifeng Wang, Beijing (CN); Weide Zhang, Beijing (CN); Zhuo Chen, Beijing (CN); Wei He, Beijing (CN); Kaiwen Feng, Beijing (CN); Jingchao Feng, Beijing (CN)

(73) Assignee: Beijing Baidu Netcom Science And Technology Co., Ltd, Beijing (CN)

( * ) Notice: Subject to any disclaimer, the term of this patent is extended or adjusted under 35 U.S.C. 154(b) by 0 days.

(21) Appl. No.: 15/410,188

(22) Filed: Jan. 19, 2017

(65) Prior Publication Data
US 2018/0077232 A1  Mar. 15, 2018

(30) Foreign Application Priority Data
Sep. 14, 2016 (CN) .......................... 2016 1 0827280

(51) Int. Cl.
*H04L 29/08* (2006.01)
*H04L 12/24* (2006.01)
*H04L 12/26* (2006.01)

(52) U.S. Cl.
CPC ...... *H04L 67/1034* (2013.01); *H04L 41/0668* (2013.01); *H04L 41/0893* (2013.01);
(Continued)

(58) Field of Classification Search
CPC . H04L 67/1034; H04L 63/10; H04L 67/1095; H04L 67/141
See application file for complete search history.

(56) References Cited

U.S. PATENT DOCUMENTS

| 8,090,856 B1 * | 1/2012 | Bonefas | ................ | H04L 63/101 709/230 |
| 2003/0084337 A1 * | 5/2003 | Simionescu | .......... | G06F 9/4416 713/190 |

(Continued)

FOREIGN PATENT DOCUMENTS

CN  101877714 A  11/2010

*Primary Examiner* — Jason D Recek
*Assistant Examiner* — Lesa M Kennedy
(74) *Attorney, Agent, or Firm* — Miller, Matthias & Hull LLP

(57) ABSTRACT

The present application discloses a method and device for establishing communication connection. An embodiment of the method includes: selecting a predetermined number of servers from a server cluster to form a backup server cluster, the server cluster including at least one server adapted to implement a given service; obtaining communication information of each backup server in the backup server cluster, and selecting a backup server from the backup server cluster as a master server based on the communication information of the backup server; and sending the communication information of the master server to controlled equipment controlled by the server cluster to establish communication connection between the master server and the controlled equipment. The embodiment solves a problem of reliability raised when main server abnormally quits or restarts during the operation of a system.

19 Claims, 5 Drawing Sheets

(52) U.S. Cl.
CPC .......... *H04L 43/0817* (2013.01); *H04L 43/10* (2013.01); *H04L 67/1095* (2013.01); *H04L 67/141* (2013.01)

(56) References Cited

U.S. PATENT DOCUMENTS

| | | | |
|---|---|---|---|
| 2009/0183016 A1* | 7/2009 | Chan | G06F 1/3203 |
| | | | 713/323 |
| 2010/0042715 A1* | 2/2010 | Tham | G06F 11/2025 |
| | | | 709/224 |
| 2012/0060053 A1* | 3/2012 | White | G06F 11/2025 |
| | | | 714/6.3 |
| 2013/0054822 A1* | 2/2013 | Mordani | H04L 67/1034 |
| | | | 709/228 |
| 2013/0254578 A1* | 9/2013 | Huang | G06F 1/266 |
| | | | 713/330 |
| 2014/0229589 A1* | 8/2014 | Bennah | G06F 11/2025 |
| | | | 709/221 |
| 2017/0116094 A1* | 4/2017 | Zhang | G06F 11/2028 |

\* cited by examiner

METHOD AND DEVICE FOR ESTABLISHING COMMUNICATION CONNECTION

CROSS-REFERENCE TO RELATED APPLICATION

This application is related to and claims priority from Chinese Application No. 201610827280.2, filed on Sep. 14, 2016, the entire disclosure of which is hereby incorporated by reference.

TECHNICAL FIELD

The present application relates to the field of computer technology, particularly relates to the field of Internet technology, and more particularly relates to a method for establishing communication connection.

BACKGROUND

Currently, a control system with a relatively high security and stability requirement is equipped with more than one servers or controllers. The servers or controllers in the system mostly employ a standby redundancy, or restart the servers or controllers that abnormally quit to solve the security and stability problem in the system. However, in the standby redundancy mode, all units or equipment controlled by the master server or master controller must obtain the parameters required for the communication from the master server or master controller before establishing communication with the master server or master controller, the master server or master controller is very important in the entire control system. The eventual collapse of the master server or master controller will lead the whole control system to collapse, thus causing the system to lose control, and unable to guarantee the system security and stability. The approach to restart the abnormally quit servers or controllers will cause the master server or controller as well as the controlled equipment to lose data, resulting in the system unable to operate normally after the system restart.

SUMMARY

An objective of the present application is to propose an improved method and device for establishing communication connection to solve the technical problem mentioned in the Background.

In a first aspect, the present application provides a method for establishing communication connection, the method including: selecting a predetermined number of servers from a server cluster to form a backup server cluster, the server cluster including at least one server adapted to implement a given service; obtaining communication information of each backup server in the backup server cluster, and selecting a backup server from the backup server cluster as a master server based on the communication information of the backup server; and sending the communication information of the master server to controlled equipment controlled by the server cluster to establish communication connection between the master server and the controlled equipment.

In some embodiments, the communication information of the backup server includes a serial number of the backup server; and the selecting a backup server from the backup server cluster as a master server based on the communication information of the backup server comprises: selecting the backup server as the master server from the backup server cluster based on a magnitude of a serial number of each of the backup servers in the backup server cluster.

In some embodiments, the method further comprises: obtaining the communication information of the master server; judging whether the master server is normal based on the communication information of the master server; and removing the master server from the backup server cluster in response to the master server being abnormal, initializing at least one server from the server cluster as a new backup server, adding the new backup server to the backup server cluster so that the number of the backup servers in the backup server cluster equals the predetermined number, and selecting a backup server from the backup server cluster as the master server based on the communication information of the backup server.

In some embodiments, the communication information of the master server comprises heartbeat information; and the judging whether the master server is normal based on the communication information of the master server comprises: sending a detection instruction of the heartbeat information to the master server; and determining whether the master server is normal based on whether a heartbeat package is returned by the master server within a predetermined period.

In some embodiments, the selecting a backup server from the backup server cluster as a master server comprises: obtaining backup data from a preset data backup region, the backup data including master server backup data and controlled equipment backup data; and writing the master server backup data into the master server.

In some embodiments, the sending the communication information of the master server to controlled equipment controlled by the server cluster to establish communication connection between the master server and the controlled equipment comprises: starting the controlled equipment controlled by the server cluster; obtaining pre-stored master server registration information stored in the controlled equipment; extracting registration information of the master server from a preset information registration table, and matching the registration information of the master server with the pre-stored master server registration information to generate a matching result; and establishing the communication connection between the master server and the controlled equipment based on the matching result.

In some embodiments, the method further comprises: sending a detection instruction of the heartbeat information to the controlled equipment; determining whether the controlled equipment is normal based on whether a heartbeat package is returned by the controlled equipment within the predetermined period; restarting the controlled equipment if the controlled equipment is abnormal, and writing the controlled equipment backup data into the restarted controlled equipment; and writing the registration information of the master server into the pre-stored master server registration information of the controlled equipment.

In a second aspect, the present application provides a device for establishing communication connection, the device including: a forming unit configured to select a predetermined number of servers from a server cluster to form a backup server cluster, the server cluster including at least one server adapted to implement a given service; a selecting unit configured to obtain communication information of each backup server in the backup server cluster, and select a backup server from the backup server cluster as a master server based on the communication information of the backup server; and a communication connection establishing unit configured to send the communication information of the master server to controlled equipment controlled by the server cluster to establish communication connection between the master server and the controlled equipment.

In some embodiments, the communication information of the backup server includes a serial number of the backup server; and the selecting unit is further configured to: select the backup server as the master server from the backup server cluster based on a magnitude of a serial number of each of the backup servers in the backup server cluster.

In some embodiments, the device further comprises a server abnormity processing unit configured to: obtain the communication information of the master server; judge whether the master server is normal based on the communication information of the master server; and remove the master server from the backup server cluster in response to the master server being abnormal, initialize at least one server from the server cluster as a new backup server, add the new backup server to the backup server cluster so that the number of the backup servers in the backup server cluster equals the predetermined number, and select a backup server from the backup server cluster as the master server based on the communication information of the backup server.

In some embodiments, the communication information of the master server includes heartbeat information; and the server abnormity processing unit is further configured to: send a detection instruction of the heartbeat information to the master server; and determine whether the master server is normal based on whether a heartbeat package is returned by the master server within a predetermined period.

In some embodiments, the selecting unit is further configured to: obtain backup data from a preset data backup region, the backup data including master server backup data and controlled equipment backup data; and write the master server backup data into the master server.

In some embodiments, the communication connection establishing unit is further configured to: start the controlled equipment controlled by the server cluster; obtain pre-stored master server registration information stored in the controlled equipment; extract registration information of the master server from a preset information registration table, and match the registration information of the master server with the pre-stored master server registration information to generate a matching result; and establish the communication connection between the master server and the controlled equipment based on the matching result.

In some embodiments, the device further comprises a controlled equipment abnormity processing unit configured to: send a detection instruction of the heartbeat information to the controlled equipment; determine whether the controlled equipment is normal based on whether a heartbeat package is returned by the controlled equipment within the predetermined period; restart the controlled equipment if the controlled equipment is abnormal, and write the controlled equipment backup data into the restarted controlled equipment; and write the registration information of the master server into the pre-stored master server registration information of the controlled equipment.

The method and the device for establishing communication connection provided in the present application selects a predetermined number of backup servers from a server cluster, selects one backup server from the backup server cluster as a master server based on the communication information of the backup server, and sends the communication information of the master server to the controlled equipment to establish communication connection between the master server and the controlled equipment. A problem of reliability raised when the main server abnormally quits or restarts during the operation of the system is solved.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
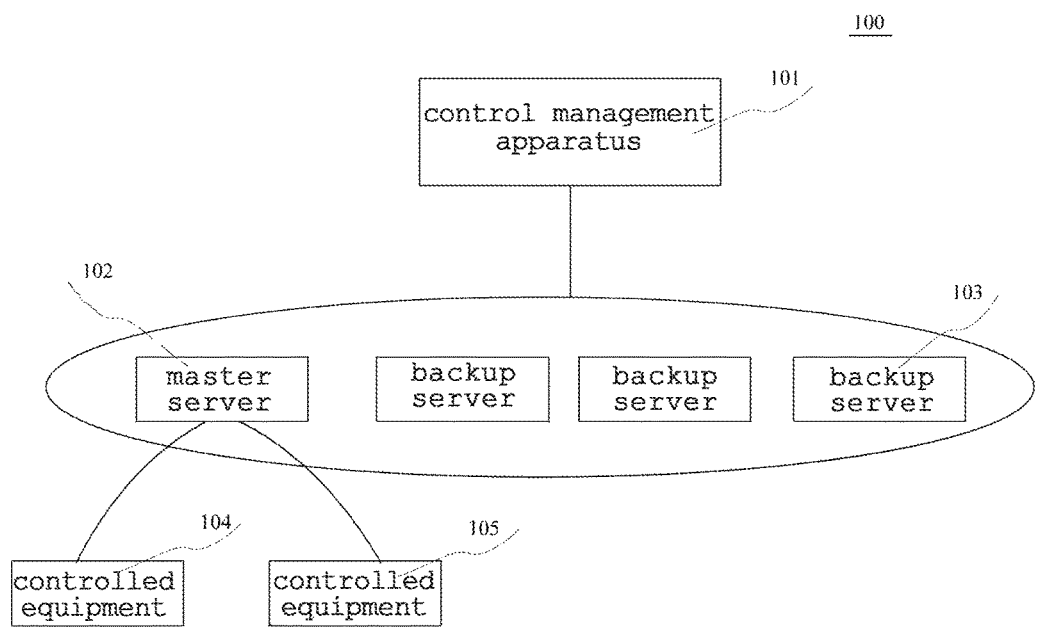
FIG. 1 is a diagram of an illustrated system architecture to which the present application may be applied.

As shown in FIG. 1, a system framework 100 may include a management control apparatus 101, a master server 102, a backup server 103, controlled equipment 104 and controlled equipment 105.

The management control apparatus 101 may be a server that provides management and control service, for example, managing and controlling the master server 102, the backup server 103, the controlled equipment 104 and the controlled equipment 105, for example, testing the states of the equipment, based on the test result, switching the master server and updating the data of the master server 102, the backup server 103, the controlled equipment 104 and the controlled equipment 105.

The controlled equipment 104 and the controlled equipment 105 are control nodes in the system's bottom layer, which perform information interchange with the master server 102, implementing a specific control service, for example, the controlled equipment 104 and the controlled equipment 105 may be equipment used to obtain and process the data from a sensor, and may also be equipment that percepts a computation program. Here, an information interchange may also take place between the controlled equipments.

The master server 102 is used to connect the management control apparatus 101 with the controlled equipment 104 and the controlled equipment 105, and controls to the controlled equipment 104 and the controlled equipment 105.

The backup server 103 serves as a backup apparatus to the master server 102. The backup server 103 is in a standby mode when the master server 102 operates normally. When a problem such as failure or abnormity arises in the master server, one server may be automatically selected from the backup servers as a new master server to replace the original master server.

It should be noted that the method for establishing communication connection provided by the embodiments of the present application is generally executed by the management control apparatus 101, accordingly, devices for establishing communication connection are generally implemented in the management control apparatus 101.

It should be understood that the number of the management control apparatus, the master server, the backup server and the controlled equipment is merely schematic. Depending on the actual requirement, there may be any number of management control apparatus, master servers, backup servers and controlled equipment.

Figure 2:
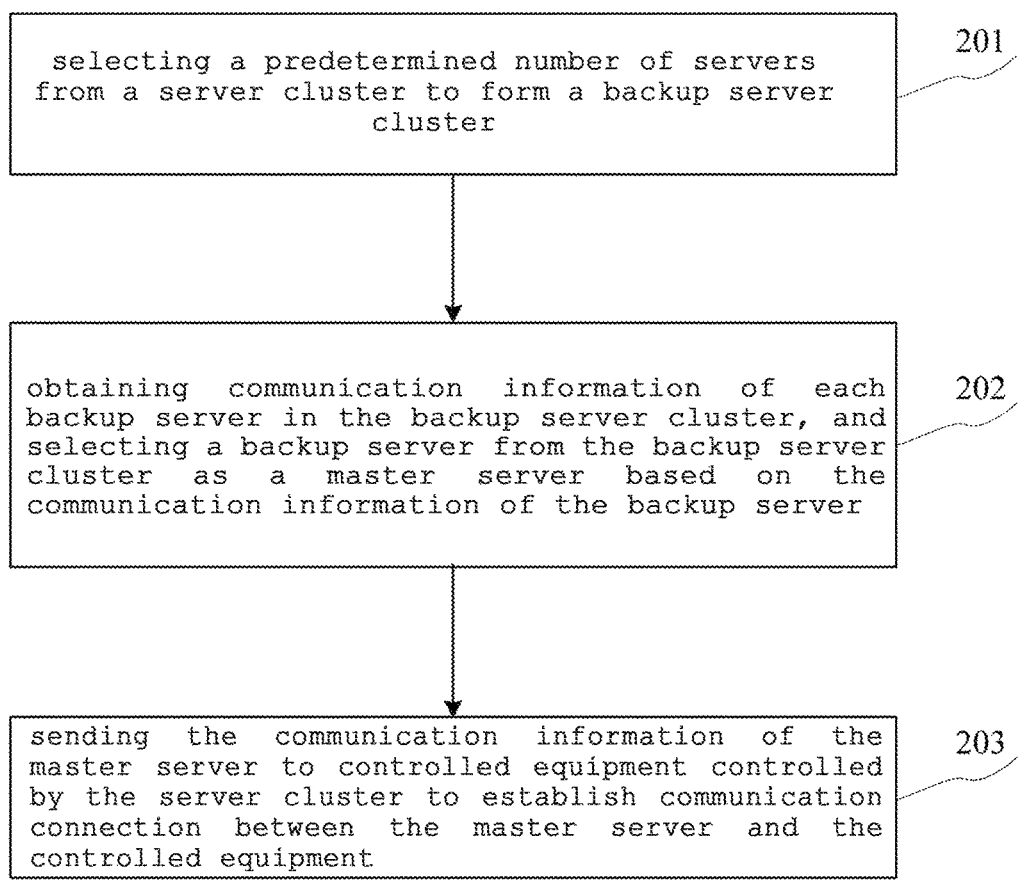
FIG. 2 is a flowchart of a method of establishing communication connection according to an embodiment of the present application.

Continuing to refer to FIG. 2, a flowchart 200 of a method for establishing communication connection according to one embodiment of the present application is shown. The method for establishing communication connection includes the following step.

Step 201, selecting a predetermined number of servers from a server cluster to form a backup server cluster.

In the present embodiment, the electronic equipment (for example a management control apparatus shown in FIG. 1) on which the method for establishing communication connection is executed may perform communication or data exchange with the master server, the backup server or the controlled equipment via wired or wireless connection. The electronic equipment selects a predetermined number of servers from a server cluster to which the electronic equipment is connected to form a backup server cluster. Here, the server cluster includes at least one server used to implement a given service. The given service means that the server performs information interchange with the management control apparatus and the controlled equipment in a system comprising the management control apparatus, the server and the controlled equipment, for example, obtaining information of the controlled equipment, obtaining instruction from the management control apparatus, being controlled by the management control apparatus and controlling and managing the controlled equipment.

Generally, the servers in the server cluster include a master server and a backup server. The master server communicatively connects with the management control apparatus and the controlled equipment, and may exchange data with the management control apparatus and the controlled equipment. The backup server is used as the backup equipment of the master server. When the master server is in normal operation, the backup server synchronizes with the master server. When the master server fails or quits abnormally, the backup server replaces the master server to provide a service.

For selecting a predetermined number of the servers from the server cluster, the electronic equipment may obtain information of the respective servers in the server cluster, determines the state of the servers based on the information of the servers, and selects the predetermined number of the servers from the servers which are in the standby state. The predetermined number is a preset number, and is a natural number. The predetermined number may be set based on the number of the master servers and the number of the backup servers which provide services in the server cluster. For determining the state of the servers in the server cluster, a sensor may be used to detect the status information of the servers. The state of a server can be acquired based on the status information of the server. Alternatively, the state of a server may also be obtained through a method for detecting a server port.

Step 202, obtaining communication information of each backup server in the backup server cluster, and selecting a backup server from the backup server cluster as a master server based on the communication information of the backup server.

In the present embodiment, based on the backup server cluster formed in Step 201, the electronic equipment obtains the communication information of each of the backup servers in the backup server cluster. Here, for obtaining the communication information of a server, the electronic equipment may request for obtaining the communication information of each of the servers in the backup server cluster on schedule or sends a request for obtaining the communication information of each of the servers in the backup server cluster in a poll mode to obtain the communication information of each of the servers in the backup server cluster. Alternatively, the servers in the backup server cluster actively send the communication information of the servers to the electronic equipment in a interrupted way, when the server in the backup server cluster fails or quits abnormally. The communication information includes: parameter information that influences the information interaction between the server and the management control apparatus or controlled equipment, such as port information, address information, communication link information, Transmission Control Protocol (TCP), sampling frequency, baud rate, symbol error rate, network interface rate, and interface mode, as well as data transmitted or exchanged during the information interaction, such as input information, output information and check information. One backup server is selected from the backup server cluster as a master server based on the communication information of the server. Here, a server in the same address section as the controlled equipment may be selected based on the server address information. A server may be selected based on the sampling frequency, symbol error rate, and/or network interface rate. For example, the parameter of the servers may be compared respectively, to select a server with the highest sampling frequency, low symbol error rate, and high network interface rate as the master server.

In some alternative implementations of the present embodiment, the communication information of the backup server includes a serial number of the backup server; and the selecting a backup server from the backup server cluster as a master server based on the communication information of the backup server comprises: selecting the backup server as the master server from the backup server cluster based on a magnitude of a serial number of each of the backup servers in the backup server cluster. For example, a server with the least serial number can be determined as the backup master server. The serial number of a server may be a preset serial number, and may be a serial number provided by the management control apparatus when the backup server is established or added to the backup server cluster.

In some alternative implementations of the present embodiment, the method also includes: obtaining the communication information of the master server; judging whether the master server is normal based on the communication information of the master server; and removing the master server from the backup server cluster in response to the master server being abnormal, initializing at least one server from the server cluster as a new backup server, adding the new backup server to the backup server cluster so that the number of the backup servers in the backup server cluster equals the predetermined number, and selecting a backup server from the backup server cluster as the master server based on the communication information of the backup server. The status of a server can be determined through the information describing the running status of the server in the communication information, such as information received via a port on the server. In response to the abnormality of the master server, the master server is removed from the backup server cluster. When a server in the backup server cluster fails or becomes abnormal, the number of servers capable of normally providing services in the backup server cluster is less than a preset value. To ensure that a normal backup server can replace the master server that fails or abnormally quits, it is necessary to ensure that the number of servers that are in the normal state is the predetermined number. At least one server in the server cluster is started, and added to the backup server cluster so that the number of the servers that are in the normal state in the server cluster is to be the predetermined number. The server in the abnormal state is removed from the backup server cluster. The communication information of the master server may be information acquired by the electronic equipment detecting the master server. For example, the electronic equipment sends an instruction of obtaining the communication information to the master server to obtain the communication information of the master server on schedule or in a poll way. Alternatively, the master server may actively send the communication information of the master server to the electronic equipment in an interrupted way when the master server fails or abnormally quits.

In some alternative implementations of the present embodiment, the communication information of the master server comprises heartbeat information; and the judging whether the master server is normal based on the communication information of the master server comprises: sending a detection instruction of the heartbeat information to the master server; and determining whether the master server is normal based on whether a heartbeat package is returned by the master server within a predetermined period. Here, the electronic equipment sends a detection instruction for the heartbeat information to the server, and determines whether the server is normal by judging whether the heartbeat information is returned by the server within a set period. If it is returned, it represents that the server is normal. Alternatively, the electronic equipment may send a heartbeat package to the server, directly. If a heartbeat package is returned by the server in a set period, it represents that the server is normal.

In some alternative implementations of the present embodiment, the selecting a backup server from the backup server cluster as a master server comprises: obtaining backup data from a preset data backup region, the backup data including master server backup data and controlled equipment backup data; and writing the master server backup data into the master server.

Here, the backup data of the master server is stored in the preset data backup region of the electronic equipment. The electronic equipment obtains the backup data of the master server from the preset data backup region, and writes the backup data of the master server into the selected master server, so as to restore the data and/or communication information in the selected master server to the data and/or communication information during the normal operation. The backup data of the master server may be the status data of the master server itself, the data obtained by the master server through interacting with the device communicatively connected with the master server, the data obtained from the operation of the master server, and the data of the device or obtained from the operation of the device communicatively connected with the master server.

Step 203, sending the communication information of the master server to controlled equipment controlled by the server cluster to establish communication connection between the master server and the controlled equipment.

In the present embodiment, the electronic equipment on which a communication connection establishing method is implemented presets a data backup region for storing backup data of the master server and the controlled equipment.

In the present embodiment, the electronic equipment establishes communication connection between the master server and the preset data storage region so that the preset data backup region exchanges information with the master server; establishes communication connection between the master server and the controlled equipment so that the communication information of the master server is sent to the controlled equipment controlled by the server cluster; and establishes communication connection between pieces of equipment controlled by the server cluster so as to transmit data and exchange information between the pieces of the controlled equipment.

In some alternative implementations of the present embodiment, establishing the communication connection between the master server and the controlled equipment may comprise: starting, by using the master server, the controlled equipment controlled by the server cluster; obtaining pre-stored master server registration information stored in the controlled equipment; extracting registration information of the master server from a preset information registration table, and matching the registration information of the master server with the pre-stored master server registration information to generate a matching result; and establishing the communication connection between the master server and the controlled equipment based on the matching result. Here, the pre-stored master server registration information is the information of the master server for controlling and/or managing the controlled equipment, which is stored in the controlled equipment itself. The preset information registration table is an information table used to store distinguishing features of the master server and preset in the management control apparatus. The registration information of the master server includes: serial number information, address information, port information, communication link information, Transmission Control Protocol (TCP), User Datagram Protocol (UDP), input information, output information, and the like. The controlled equipment establishes a communication with the master server based on the registration information of the master server. When the registration information of the master server matches the pre-stored master server registration information in the controlled equipment, the communication connection between the master server and the controlled equipment is established. The "matching" means that the registration information of the master server and the pre-stored master server registration information in the controlled equipment may have the same distinguishing feature, for example, the same communication link information, the same address information, or the same TCP.

In some alternative implementations of the present embodiment, the method also includes: sending a detection instruction of the heartbeat information to the controlled equipment; determining whether the controlled equipment is normal based on whether a heartbeat package is returned by the controlled equipment within the predetermined period;

restarting the controlled equipment in response to an abnormality of the controlled equipment, and writing the controlled equipment backup data into the restarted controlled equipment; and writing the registration information of the master server into the pre-stored master server registration information of the controlled equipment. Here, determining whether the controlled equipment is normal may include: sending a detection instruction of the heartbeat information to the controlled equipment, and determining whether the server is normal by judging whether heartbeat information is returned from the controlled equipment within a set period. If the heartbeat information is received, the controlled equipment is normal. Alternatively, a heartbeat package may be directly sent to the controlled equipment. If a heartbeat package is returned from the controlled equipment within a set period, the controlled equipment is normal. If the controlled equipment is abnormal, it needs to be restarted. To ensure that the restarted controlled equipment may be able to operate normally, the data of the controlled equipment is to be restored to the data in a normal operation status. The backup data of the controlled equipment in the preset data backup region may be written into the controlled equipment. Meanwhile, the registration information of the master server of the controlled equipment may be written into the pre-stored master server registration information of the controlled equipment. The backup data of the controlled equipment may be the status data of the controlled equipment itself, the sense data obtained by the controlled equipment from a sensor communicatively connected with the controlled equipment, the control data output according to the operation based on the sense data, and the distinguishing feature data of the master server connected with the controlled equipment or the control instruction data sent from the master server.

Figure 3:
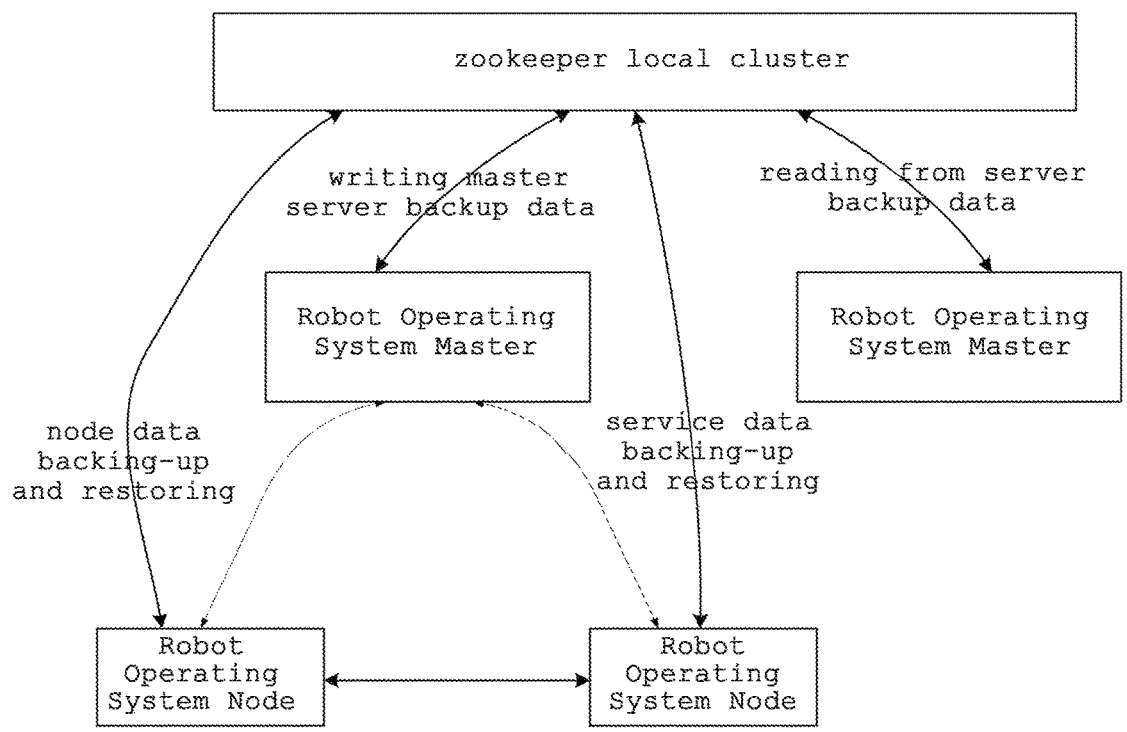
FIG. 3 is a schematic diagram showing an application scenario of a method of establishing communication connection according to the present application.

Referring to FIG. 3, it is a schematic diagram of an application scenario of the method for establishing communication connection according to the present embodiment. FIG. 3 shows a control system including: a zookeeper local cluster, servers and controlled equipment. In the control system, the zookeeper local cluster manages and controls the servers and controlled equipment. The servers are robot operating system masters (ROS Masters) including a main ROS master and a slave ROS master. The controlled equipment is robot operating system nodes (ROS Nod) in the system, which may be processing nodes in the ROS system and may be a detection device, a control device or a communication device connected with the main ROS Master. The zookeeper local cluster selects a predetermined number of the servers from a server cluster to form a backup server cluster, obtains communication information of each of the backup servers in the backup server cluster, and selects one backup server with a least serial number in the serial number information from the backup server cluster as the master server, namely, selecting a ROS Master with least serial number from the ROS Masters as the main ROS Master. The communication connection between the main ROS Master and the data backup region preset in the zookeeper local cluster is established, and the backup data of the master server in the data backup region is written into the main ROS Master. Then, the main ROS Master establishes communication connection between ROS Nodes connected with the main ROS Master, and the communication information of the main ROS Master is written into the ROS Nodes. Data is transmitted and information is exchanged between the ROS Nods based on the communication information of the main ROS Master.

The method provided in the embodiment of the present application selects a backup server from the backup server cluster as the master server based on the communication information of the servers, so as to solve the problem of reliability raised when the master server abnormally quits or restarts during the operation of the system.

Figure 4:
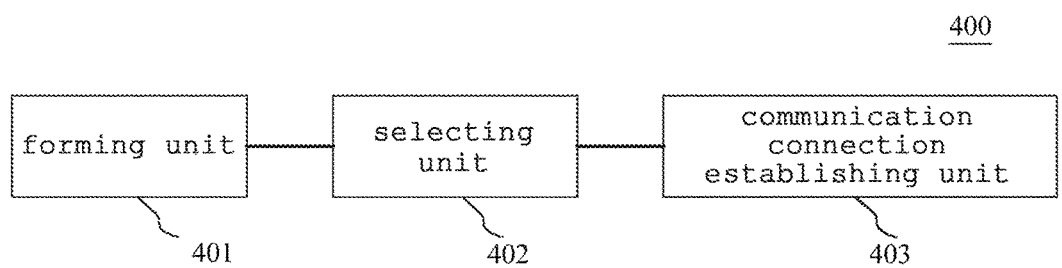
FIG. 4 is a schematic diagram showing a device of establishing communication connection according to an embodiment of the present application.

Referring to FIG. 4, the present application provides an embodiment of a communication connection establishing device for implementing the method shown in the above-mentioned figures. The device of the embodiment corresponds to the method of the embodiment shown in FIG. 2, and may be applied to various electronic devices.

As shown in FIG. 4, the communication connection establishing device 400 of the present embodiment includes a forming unit 401, a selecting unit 402 and a communication connection establishing unit 403. The forming unit 401 is configured to select a predetermined number of servers from a server cluster to form a backup server cluster, the server cluster including at least one server adapted to implement a given service; the selecting unit 402 is configured to obtain communication information of each backup server in the backup server cluster, and select a backup server from the backup server cluster as a master server based on the communication information of the backup server; and the communication connection establishing unit 403 is configured to send the communication information of the master server to controlled equipment controlled by the server cluster to establish communication connection between the master server and the controlled equipment.

In the present embodiment, the forming unit 401 of the communication connection establishing device 400 selects a predetermined number of the servers from the server cluster connected with the forming unit 401 to form a backup server cluster. The server cluster includes at least one server used to implement the same service.

In the present embodiment, based on the backup server cluster formed by the forming unit 401, the selecting unit 402 obtains communication information of each backup server in the backup server cluster, and selects a backup server from the backup server cluster as a master server based on the communication information.

In the present embodiment, a data backup region is preset in the device, and stores the backup data of the master server and the controlled equipment. The communication connection establishing unit 403 establishes the communication connection between the master server and the preset data storage region so that the preset data backup region exchanges information with the master server; establishes communication connection between the master server and the controlled equipment so that the communication information of the master server is sent to the controlled equipment controlled by the server cluster; and establishes communication connection between pieces of equipment controlled by the server cluster so as to transmit data and exchange information between the pieces of the controlled equipment.

In some alternative implementations of the present embodiment, the communication information of the backup server includes a serial number of the backup server; and the selecting unit is further configured to select the backup server as the master server from the backup server cluster based on a magnitude of a serial number of each of the backup servers in the backup server cluster. For example, a server with the least serial number can be determined as the backup master server. The serial number of a server may be a preset serial number, and may be a serial number provided by the management control apparatus when the backup server is established or added to the backup server cluster.

In some alternative implementations of the present embodiment, the device also includes a server abnormity processing unit configured to judge whether the master server is normal based on the communication information of the master server; and remove the master server from the backup server cluster in response to the master server being abnormal, initialize at least one server from the server cluster as a new backup server, add the new backup server to the backup server cluster so that the number of the backup servers in the backup server cluster equals the predetermined number, and select a backup server from the backup server cluster as the master server based on the communication information of the backup server. The status of the server may be determined based on the information which describes the running state of the server in the communication information. The communication information also includes heartbeat information, by which the master server is determined to be normal or abnormal. The server abnormity processing unit sends a detection instruction for the heartbeat information to the server, and determines whether the server is normal by judging whether the heartbeat information is returned by the server within a set period. If it is returned, it represents that the server is normal. Alternatively, the electronic equipment may send a heartbeat package to the server, directly. If a heartbeat package is returned by the server in a set period, it represents that the server is normal.

In some alternative implements of present embodiments, the selecting unit is further configured to obtain backup data from a preset data backup region, the backup data including master server backup data and controlled equipment backup data; and write the master server backup data into the master server. The selecting unit 402 obtains the backup data of the master server from the preset data backup region, and writes the backup data of the master server into the selected master server, so as to restore the data and/or communication information in the selected master server to the data and/or communication information during the normal operation.

In some alternative implementations of the present embodiment, the communication connection establishing unit is further configured to start the controlled equipment controlled by the server cluster; obtain pre-stored master server registration information stored in the controlled equipment; extract registration information of the master server from a preset information registration table, and match the registration information of the master server with the pre-stored master server registration information to generate a matching result; and establish the communication connection between the master server and the controlled equipment based on the matching result. Here, the controlled equipment stores in itself the registration information of the master server, and establishes communication between the controlled equipment and the master server based on the registration information of the master server. The preset information registration table is an information table used to store the master server distinguishing feature and preset in the device.

In some alternative implementations of the present embodiment, the device also includes a controlled equipment abnormity processing unit configured to send a detection instruction of the heartbeat information to the controlled equipment; determine whether the controlled equipment is normal based on whether a heartbeat package is returned by the controlled equipment within the predetermined period; restart the controlled equipment if the controlled equipment is abnormal, and write the controlled equipment backup data into the restarted controlled equipment; and write the registration information of the master server into the pre-stored master server registration information of the controlled equipment. Here, when the controlled unit fails or is abnormal, the controlled equipment abnormity processing unit restarts the controlled equipment and returns the data during the normal state of the controlled equipment. The abnormity processing unit may monitor the status of the controlled equipment by sending a heartbeat information detection instruction to the controlled equipment.

The selecting unit 402 provided by the embodiment of the present application selects a backup server from the backup server cluster as the master server based on the communication information of the servers, so as to solve the problem of reliability raised when the master server abnormally quits or restarts during the operation of the system.

Figure 5:
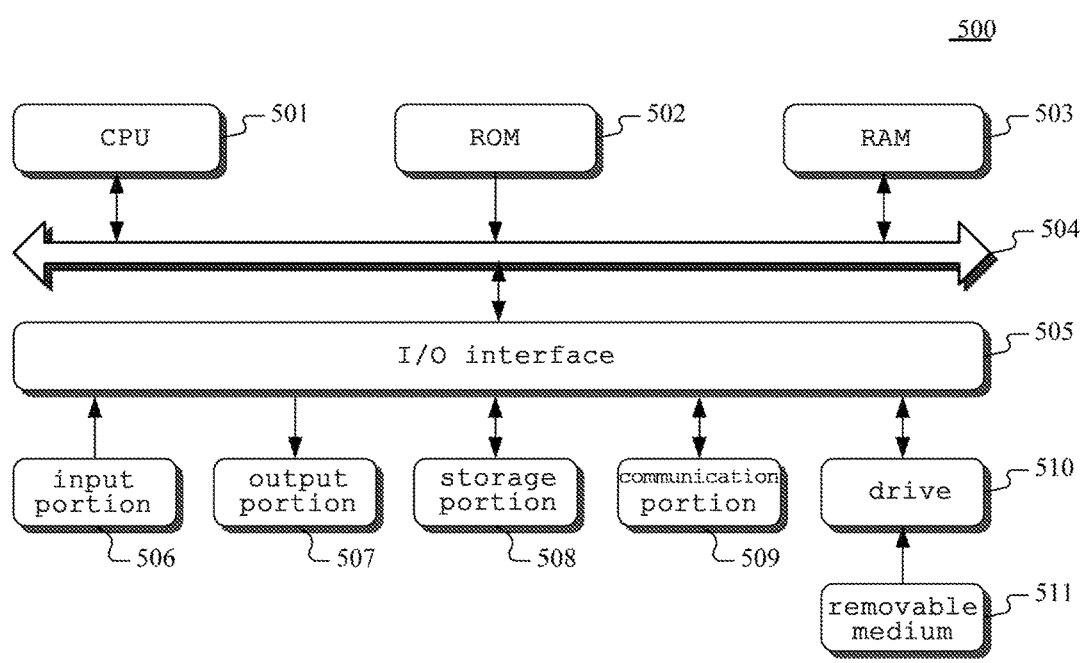
FIG. 5 is a structural schematic diagram of a computer system of a management control apparatus suitable for implementing the embodiment of the present application.

Referring to FIG. 5, a schematic structural diagram of a computer system 500 adapted to implement a terminal apparatus of the embodiments of the present application is shown.

As shown in FIG. 5, the computer system X00 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a forming unit, a selecting unit and a communication connection establishing unit, where the names of these units or modules are not considered as a limitation to the units or modules. For example, the forming unit may also be described as "a unit for selecting a predetermined number of servers from a server cluster to form a backup server cluster".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: select a predetermined number of servers from a server cluster to form a backup server cluster, the server cluster including at least one server adapted to implement a given service; obtain communication information of each backup server in the backup server cluster, and select a backup server from the backup server cluster as a master server based on the communication information of the backup server; and send the communication information of the master server to controlled equipment controlled by the server cluster to establish communication connection between the master server and the controlled equipment.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for establishing communication connection, the method comprising:
    selecting a predetermined number of servers from a server cluster to form a backup server cluster, the server cluster including at least one server adapted to implement a given service;
    obtaining communication information of each backup server in the backup server cluster, and selecting a backup server from the backup server cluster as a master server based on the communication information of the backup server, wherein the communication information comprises at least one of Transmission Control Protocol (TCP), sampling frequency, baud rate, symbol error rate, network interface rate, or interface mode;
    sending the communication information of the master server to a controlled equipment controlled by the server cluster to establish communication connection between the master server and the controlled equipment,
    wherein the sending the communication information of the master server to a controlled equipment controlled by the server cluster to establish communication connection between the master server and the controlled equipment comprises:
    sending a detection instruction of a heartbeat information to the controlled equipment;
    determining whether the controlled equipment is normal based on whether a heartbeat package is returned by the controlled equipment within a predetermined period;
    restarting the controlled equipment if the controlled equipment is abnormal, and writing controlled equipment backup data into the restarted controlled equipment, wherein the controlled equipment backup data comprises status data of the controlled equipment, sense data obtained from a sensor, control data obtained based on a calculation on the sense data, and control instruction data sent from the master server; and
    writing registration information of the master server into pre-stored master server registration information of the controlled equipment.

2. The method according to claim 1, wherein the communication information of the backup server includes a serial number of the backup server; and
    the selecting a backup server from the backup server cluster as a master server based on the communication information of the backup server comprises:
    selecting the backup server as the master server from the backup server cluster based on a magnitude of a serial number of each of the backup servers in the backup server cluster.

3. The method according to claim 1, further comprising:
    obtaining the communication information of the master server;
    judging whether the master server is normal based on the communication information of the master server; and
    removing the master server from the backup server cluster in response to the master server being abnormal, initializing at least one server from the server cluster as a new backup server, adding the new backup server to the backup server cluster so that the number of the backup servers in the backup server cluster equals the predetermined number, and selecting a backup server from the backup server cluster as the master server based on the communication information of the backup server.

4. The method according to claim 3, wherein the judging whether the master server is normal based on the communication information of the master server comprises:
    sending a detection instruction of the heartbeat information to the master server; and
    determining whether the master server is normal based on whether a heartbeat package is returned by the master server within the predetermined period.

5. The method according to claim 4, wherein the selecting a backup server from the backup server cluster as a master server comprises:
    obtaining backup data from a preset data backup region, the backup data including master server backup data and the controlled equipment backup data, wherein the master server backup data comprises: status data of the master server, data obtained by the master server from the controlled equipment, operation data of the master server; and writing the master server backup data into the master server.

6. The method according to claim 5, wherein the sending the communication information of the master server to controlled equipment controlled by the server cluster to establish communication connection between the master server and the controlled equipment comprises:

starting the controlled equipment controlled by the server cluster;

obtaining the pre-stored master server registration information stored in the controlled equipment;

extracting the registration information of the master server from a preset information registration table, and matching the registration information of the master server with the pre-stored master server registration information to generate a matching result; and establishing the communication connection between the master server and the controlled equipment based on the matching result.

7. The method according to claim 5, wherein the preset data backup region is set in a zookeeper local cluster.

8. A device for establishing communication connection, the device comprising:

a forming unit configured to select a predetermined number of servers from a server cluster to form a backup server cluster, the server cluster including at least one server adapted to implement a given service;

a selecting unit configured to obtain communication information of each backup server in the backup server cluster, and select a backup server from the backup server cluster as a master server based on the communication information of the backup server, wherein the communication information comprises at least one of Transmission Control Protocol (TCP), sampling frequency, baud rate, symbol error rate, network interface rate, or interface mode;

a communication connection establishing unit configured to send the communication information of the master server to a controlled equipment controlled by the server cluster to establish communication connection between the master server and the controlled equipment, a controlled equipment abnormity processing unit configured to:

send a detection instruction of a heartbeat information to the controlled equipment;

determine whether the controlled equipment is normal based on whether a heartbeat package is returned by the controlled equipment within a predetermined period;

restart the controlled equipment if the controlled equipment is abnormal, and writing controlled equipment backup data into the restarted controlled equipment, wherein the controlled equipment backup data comprises status data of the controlled equipment, sense data obtained from a sensor, control data obtained based on a calculation on the sense data, and control instruction data sent from the master server; and write registration information of the master server into pre-stored master server registration information of the controlled equipment.

9. The device according to claim 8, wherein the communication information of the backup server includes a serial number of the backup server; and the selecting unit is further configured to:

select the backup server as the master server from the backup server cluster based on a magnitude of a serial number of each of the backup servers in the backup server cluster.

10. The device according to claim 8, further comprising a server abnormity processing unit configured to:

obtain the communication information of the master server;

judge whether the master server is normal based on the communication information of the master server; and remove the master server from the backup server cluster in response to the master server being abnormal, initialize at least one server from the server cluster as a new backup server, add the new backup server to the backup server cluster so that the number of the backup servers in the backup server cluster equals the predetermined number, and select a backup server from the backup server cluster as the master server based on the communication information of the backup server.

11. The device according to claim 10, wherein the communication information of the master server includes the heartbeat information; and the server abnormity processing unit is further configured to:

send a detection instruction of the heartbeat information to the master server; and determine whether the master server is normal based on whether a heartbeat package is returned by the master server within the predetermined period.

12. The device according to claim 11, wherein the selecting unit is further configured to:

obtain backup data from a preset data backup region, the backup data including master server backup data and the controlled equipment backup data, wherein the master server backup data comprises: status data of the master server, data obtained by the master server from the controlled equipment, operation data of the master server; and write the master server backup data into the master server.

13. The device according to claim 12, wherein the communication connection establishing unit is further configured to:

start the controlled equipment controlled by the server cluster;

obtain the pre-stored master server registration information stored in the controlled equipment;

extract the registration information of the master server from a preset information registration table, and match the registration information of the master server with the pre-stored master server registration information to generate a matching result; and establish the communication connection between the master server and the controlled equipment based on the matching result.

14. A non-transitory computer storage medium storing a computer program, which when executed by a processor, cause the processor to perform operations, the operations comprising:

selecting a predetermined number of servers from a server cluster to form a backup server cluster, the server cluster including at least one server adapted to implement a given service;

obtaining communication information of each backup server in the backup server cluster, and selecting a backup server from the backup server cluster as a master server based on the communication information of the backup server, wherein the communication information comprises at least one of Transmission Control Protocol (TCP), sampling frequency, baud rate, symbol error rate, network interface rate, or interface mode;
sending the communication information of the master server to a controlled equipment controlled by the server cluster to establish communication connection between the master server and the controlled equipment
wherein the sending the communication information of the master server to a controlled equipment controlled by the server cluster to establish communication connection between the master server and the controlled equipment comprises:
sending a detection instruction of a heartbeat information to the controlled equipment;
determining whether the controlled equipment is normal based on whether a heartbeat package is returned by the controlled equipment within a predetermined period;
restarting the controlled equipment if the controlled equipment is abnormal, and writing controlled equipment backup data into the restarted controlled equipment, wherein the controlled equipment backup data comprises status data of the controlled equipment, sense data obtained from a sensor, control data obtained based on a calculation on the sense data, and control instruction data sent from the master server; and
writing registration information of the master server into pre-stored master server registration information of the controlled equipment.

15. The non-transitory computer storage medium according to claim 14, wherein the communication information of the backup server includes a serial number of the backup server; and
the selecting a backup server from the backup server cluster as a master server based on the communication information of the backup server comprises:
selecting the backup server as the master server from the backup server cluster based on a magnitude of a serial number of each of the backup servers in the backup server cluster.

16. The non-transitory computer storage medium according to claim 14, wherein the operations further comprises:
obtaining the communication information of the master server;
judging whether the master server is normal based on the communication information of the master server; and
removing the master server from the backup server cluster in response to the master server being abnormal, initializing at least one server from the server cluster as a new backup server, adding the new backup server to the backup server cluster so that the number of the backup servers in the backup server cluster equals the predetermined number, and selecting a backup server from the backup server cluster as the master server based on the communication information of the backup server.

17. The non-transitory computer storage medium according to claim 16, wherein the judging whether the master server is normal based on the communication information of the master server comprises;
sending a detection instruction of the heartbeat information to the master server; and
determining whether the master server is normal based on whether a heartbeat package is returned by the master server within the predetermined period.

18. The non-transitory computer storage medium according to claim 17, wherein the selecting a backup server from the backup server cluster as a master server comprises;
obtaining backup data from a preset data backup region, the backup data including master server backup data and the controlled equipment backup data, wherein the master server backup data comprises: status data of the master server, data obtained by the master server from the controlled equipment, operation data of the master server; and
writing the master server backup data into the master server.

19. The non-transitory computer storage medium according to claim 18, wherein the sending the communication information of the master server to controlled equipment controlled by the server cluster to establish communication connection between the master server and the controlled equipment comprises:
starting the controlled equipment controlled by the server cluster;
obtaining the pre-stored master server registration information stored in the controlled equipment;
extracting the registration information of the master server from a preset information registration table, and matching the registration information of the master server with the pre-stored master server registration information to generate a matching result; and
establishing the communication connection between the master server and the controlled equipment based on the matching result.

* * * * *